July 5, 1927. Re. 16,668

J. A. MALM

REVERSING OIL CLUTCH

Original Filed May 31, 1921 4 Sheets-Sheet 1

Inventor

J. A. Malm.

By H. J. O'Brien

Attorney

July 5, 1927.

Re. 16,668

J. A. MALM

REVERSING OIL CLUTCH

Original Filed May 31, 1921 4 Sheets-Sheet 2

Inventor

J. A. Malm.

By A. J. O'Brien

Attorney

July 5, 1927. Re. 16,668

J. A. MALM

REVERSING OIL CLUTCH

Original Filed May 31, 1921 4 Sheets-Sheet 3

Inventor

J. A. Malm.

By A. J. O'Brien

Attorney

July 5, 1927.

Re. 16,668

J. A. MALM

REVERSING OIL CLUTCH

Original Filed May 31, 1921 4 Sheets-Sheet 4

Inventor

J. A. Malm.

By A. J. O'Brien

Attorney

Reissued July 5, 1927. Re. 16,668

UNITED STATES PATENT OFFICE.

JOHN A. MALM, OF DENVER, COLORADO.

REVERSING OIL CLUTCH.

Original application filed May 31, 1921, Serial No. 474,008. Renewed April 18, 1924. Original No. 1,525,038, dated February 3, 1925. Application for reissue filed November 17, 1926. Serial No. 148,965.

The object of this invention is to provide an oil clutch analogous in some respects to my companion application, Serial Number 474,007 which shall include mechanism for obtaining reverse as well as forward speeds.

Briefly, the invention comprises a drive shaft adapted to be coupled with an engine shaft and having reciprocably mounted thereon a piston having a cam groove adapted to be engaged by rollers mounted in a casing and co-operating with a driven shaft carrying a cam block which has a cam groove receiving rollers carried by the projecting portion of the piston. This invention also includes two reciprocable pistons connected to move together longitudinally, one piston being reciprocable on the drive shaft and the other on the driven shaft. In either case the piston on the drive shaft has its groove provided with a greater number of nodes than are provided in the groove on the cam block or piston, as the case may be, carried by the driven shaft. Where two pistons are employed the rollers which engage the cam groove of the piston on the driven shaft are also carried by the casing which houses the operative parts. Said casing is adapted to rotate but means are provided for preventing such rotation when desired. Within the casing a short cylinder is provided which cooperates with the piston on the drive shaft and with a slidable valve which controls the passage of oil from one end of said piston to the other. As the driving piston, i. e. the piston on the drive shaft, rotates, the piston or cam block on the driven shaft will tend to rotate in the opposite direction due to the fact that the number of nodes in the respective cam groove is smaller than the number of nodes in the groove on the driving piston. The amount of this reverse rotation as compared with the forward speed of the driving piston is the ratio of the excess number of nodes in the driving cam to the number of nodes in the driven or reversing cam member. For instance, if the cam groove in the driving piston contains six nodes and the groove in the cam member on the driven shaft contains four nodes, the reverse speed of said cam member on the driven shaft is two-fourths or one-half the forward speed of the driving piston, because, since the nodes on both cam grooves are all of equal lengths, movement equivalent to the two excess nodes on the driving piston must be compensated for during each rotation by reverse movement equal to two of the four nodes on the driven cam member. By opening and closing the valve above mentioned, the driving piston will be allowed to reciprocate or will be held against reciprocation as desired. When the valve is open and said driving piston is reciprocating, if the machine on which the device is installed is to be allowed to stand, the casing which contains the parts must be allowed to rotate forward at a speed equal to the amount of reverse rotation which would otherwise be imparted to the cam member on the driven shaft. If the brake member above mentioned is applied to the casing to prevent its forward rotation, reverse movement will then be imparted to the machine, it being understood that the valve is in open position.

When said brake member is released and it is desired to move forward from stationary position, the valve will be gradually closed so that the reciprocation of the driving piston will be gradually reduced. It will be obvious that as reciprocation of the driving piston is reduced, the tendency to reverse rotation of the driven cam member will also be reduced, and when the valve member is entirely closed and reciprocation of the driving piston entirely stopped, reverse rotation of the reversing cam member will also be entirely stopped and the parts including the casing will rotate bodily in a forward direction at the speed of the engine shaft to which the drive shaft is connected. The reason for rotating the casing forward when reverse movement is not desired, is to permit the rollers carried by said casing which engage in the cam grooves to rotate forward with the driving piston at the same rate which the reverse cam member would otherwise be driven in the reverse direction.

In the drawings:

Fig. 1 is a longitudinal section through the clutch;

Fig. 1[a] is a fragmentary detail view showing parts of the mechanism of Fig. 1 on a somewhat larger scale;

Figures 1, 1A:
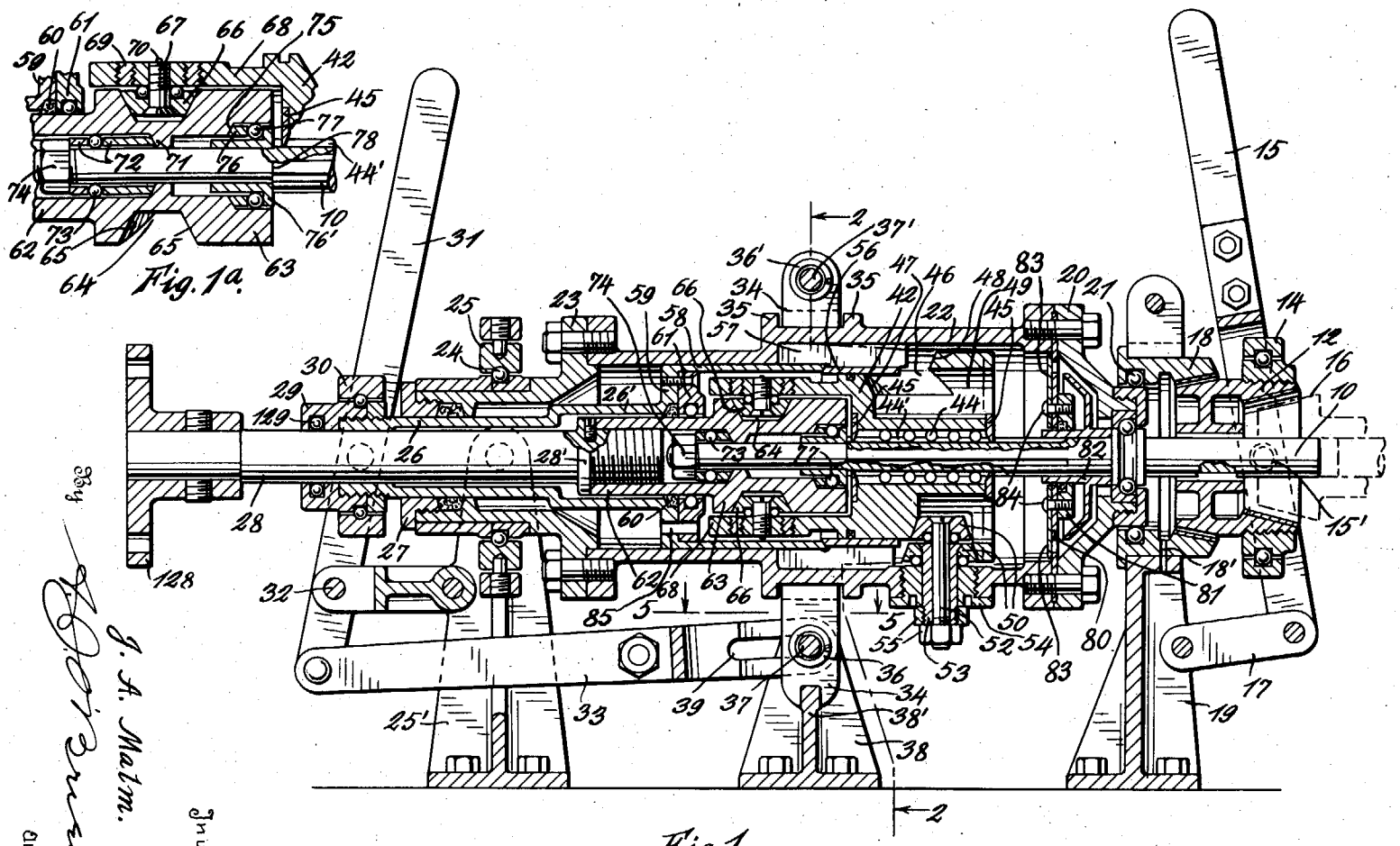
Figure 3:
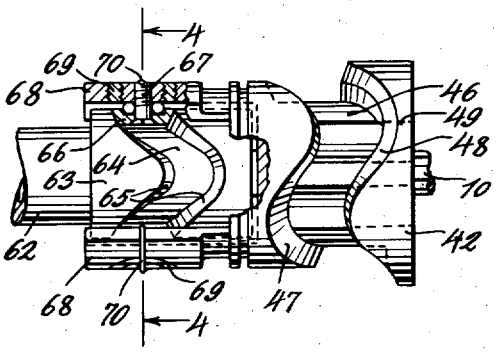
Fig. 3 is an elevational detail of the two cam members shown in Fig. 1.
Figure 4:
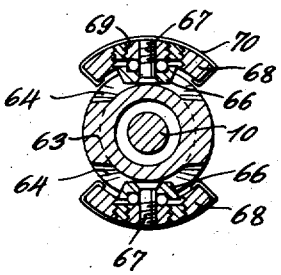
Fig. 4 is a cross section taken on the line 4—4, Fig. 3.
Figure 2:
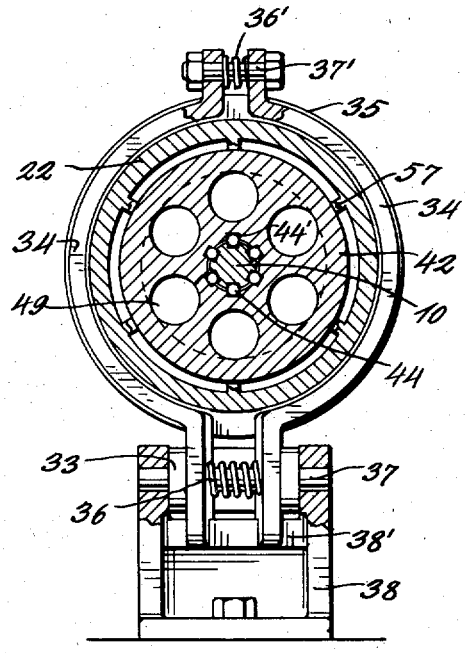
Fig. 2 is a cross section taken on the line 2—2 of Fig. 1.

The drive shaft 10 is shown provided with a clutch 12 splined on the shaft and shiftable by means of a yoke 14 operable by a handle 15 pivoted to the yoke at 15′ and pivoted at its lower end to a link 17 carried by the fixed framework 19. The clutch 12 has an inner face adapted to engage the clutch member 16 on the engine shaft, said clutch 12 also being provided with an outer face to engage with a fixed clutch part 18 mounted on the framework 19 which will serve as a brake when the clutch 12 is moved rearward into engagement therewith. Thus, when all of the parts are in high speed position, if clutch 12 is moved from engagement with the engine clutch 16, into engagement with the stationary clutch 18, the clutch 18 will serve as a brake for the machine.

Figure 5:
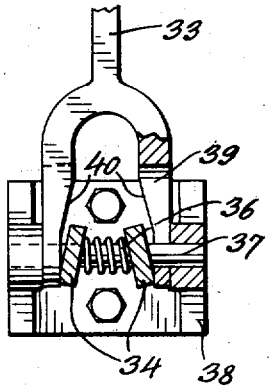
Fig. 5 is a sectional detail taken on the line 5—5 of Fig. 1.

The drive shaft 10 is journaled as by means of ball bearings shown in the head 20 which, in turn, is journaled by means of ball bearings 21 in a fixed member such as an extension of the fixed clutch part 18. The head 20 is bolted to a rotatable shell or casing 22, the latter having bolted thereto at its opposite end, a rear head 23 journaled by means of ball bearings 24 in a mounting 25 which may be adjustable as indicated, if desired, and is carried by a fixed portion of the framework 25′. A valve sleeve 26 extends through the head 23 into the casing 22 and is retained by means of a packing ring 27 which positions packing material between the sleeve 26 and the head 23 and also serves to retain the ball retainers for the balls 24. A driven shaft 28 extends through the sleeve 26 and is journaled therein by means of a bearing 29 for balls 129 which bearing has a yoke 30 connected therewith for the purpose of shifting the sleeve 26 longitudinally by means of the lever 31 which is pivoted at 32 to a link member pivoted on a standard 25′ as shown. The lower end of lever 31 is connected with a link 33 which may be in the form of an integral fork as indicated in Fig. 5. This forked link 33 is provided, for the purpose of contracting the brake bands 34 about the casing 22 to prevent rotation thereof when desired, said bands 34 being retained in position by means of a pair of spaced annular ribs 35 on the casing 22. The lower ends of the bands 34 are normally held apart by means of a spring 36 carried on a stub shaft 37 journaled in a stationary frame 38. The lower ends of the bands 34 are notched to receive an upstanding web 38′ on the frame member 38. The shaft 37 passes through the slots 39 in the forked link 33, the forks of said link being disposed between the hubs of the frame 38 and the ends of the bands 34. The tips of the forks are of uniform thickness to avoid tightening the bands during the part of the movement of the lever 31 which moves the valve sleeve 26 to open the valve. However, bevel faces 40 are provided on the forks in the rear of said tips for the purpose of engaging the lower ends of the bands 34, to force the same together and cause them to bind upon the casing 22 to prevent rotation of the same during the final stage of the movement of the lever 31 after the valve has been opened. Thus, after the valve has been opened to bring the machine to stationary position, further rearward movement of the lever 31 will cause the bands 34 to be tightened to stop rotation of the casing 22 and thereby produce reverse movement of the machine. During this further movement of the lever 31 the valve is merely retracted farther without itself producing any additional effect.

A reciprocating piston 42 is mounted upon the portion of the drive shaft 10 which projects within the casing 22, said piston being splined upon the shaft 10 by means of balls 44 held by ball retainers as disclosed in said companion application, said balls traveling in grooves 44′. Special flanges or rings 45 are provided on opposite ends of the piston and have fingers extending into said grooves to prevent passage of oil through said grooves from one end of the piston to the other and to prevent pushing the balls back and forth by the oil. The piston 42 is provided with a cam groove 46 having a rear cam face 47 and a forward cam face 48, the latter being higher than the former, said cam faces being engaged by a pair of rollers 50 of different sizes and disposed at different distances from the center of the shaft 10 to engage the respective cam faces 47 and 48 as in said companion application. The inner of these rollers 50 is carried on a stem 52 and the other on a sleeve 53, said sleeve 53 being retained in a nut 54 threaded into the casing 22, adjustment of said stem 52 and sleeve 53 being accomplished by lock nuts 55.

A short cylinder 56 is carried within the casing 22 by means of integral webs 57 on the casing walls, the rear edge of the cylinder 56 cooperating with the forward edge of a cylindrical sleeve valve 58 carried on a hub 59 which in turn is carried by an enlargement 26′ of the valve sleeve 26; said hub 59 carries packing material 60 and a ball bearing 61, these parts traveling upon a tubular extension 62 of a cam block 63. Said tubular extension 62 is threaded on to the inner end of the driven shaft 28 and abuts against a shoulder 28′ thereon. The outer end of said driven shaft 28 is conveniently provided with some coupling means 128 for connection to a shaft which extends rearwardly to the universal joint or the like.

The cam block 63 is provided with a cam groove 64 having opposed bearing walls 65 between which rollers 66 travel, said rollers being carried by stems 67 which, in turn, are mounted upon opposed arms 68 extending rearwardly from and being integral with the driving cam piston 42. Nuts 69 are employed for adjusting the position of said rollers and locking strips or wires 70, partially countersunk in grooves, are employed to prevent rotation of the parts, said strips being positioned around the sides of the arms 68.

The inner end of shaft 10 extends into a cavity in the the cam member 63, the latter having an interior annular shoulder 71 for engagement by ball retainers 72 for balls 73 which journal the inner extremity of the shaft 10 in said cam block 63, said balls and retainers being held in position by means of a securing nut 74 on the extreme end of the shaft 10. The forward portion of the block 63 is provided with a shoulder 75 against which bears a ball retainer 76 engaged by balls 77 positioned by retaining bearings 76′ these parts being held against the shoulder 75 by a shoulder 78 of the shaft 10.

In order to care for expansion of oil, due to temperature changes, a resilient diaphragm 80 is provided at the forward end of the casing 22 and held there-against by head 20. A hub 82 is fixed on the shaft 10 and is engaged by a packing retainer 81 secured to the diaphragm 80 by means of screws 84 which also retain spring valves 83 which cover small openings in said diaphragm 80. The diaphragm 80 will yield under excessive pressure and the spring valves 83 will open to permit return into the casing 22 of any excess of oil which may have leaked through into the head 20.

In the operation of this form of the invention the parts are in high speed position as shown in Fig. 1. In this position the piston 42 is locked against reciprocation on the shaft 10 and said piston together with the casing 22, and cam block 63, rotate bodily without movement relatively to one another so that the driven shaft 28 rotates forward at the same speed as the drive shaft 10. When the sleeve valve 58 is withdrawn from closed position as shown in Fig. 1 to open position, the oil is allowed to pass around the cylinder 56 from one end of the piston to the other, the large openings 49 permitting free movement. Since the cylinder 56 is comparatively short, the path of the moving oil is comparatively short and friction is thereby materially reduced. It will be noted that as the sleeve valve 58 and its hub 59 are withdrawn toward the left, the oil displaced at the left of said hub will pass through one or more openings 85 to the front of the hub, the offset portion 26′ of the valve stem causing the displacement of oil at one side of the hub 59 to be equal to that at the other side of the hub. When said sleeve is in open position, the piston 42 will be allowed to reciprocate, this reciprocation being caused by engagement of the rollers 50 in the groove 46. At the same time the rollers 66 will reciprocate in the groove 64 of the cam block 63, and in view of the fact that the groove 46 has a greater number of nodes than the groove 64, the cam block 63 will have relative reverse rotation which is the ratio of the excess number of nodes of the cam groove 46 to the number of nodes in the cam groove 64. In the form shown, the cam groove 46 has six nodes and the groove 64 has four nodes. As above pointed out, the nodes in the two grooves are of equal lengths. Therefore movements of four of the nodes of the cam groove 46 would correspond to movement along the four nodes of the groove 64, whereby the excess movement produced by the two excess nodes of groove 46 must be compensated for by an equal amount of reverse movement in the cam block 63 which reverse movement is equal to two of the four nodes of the cam groove 64. This thereby produces a reverse movement of one-half revolution of the cam block 63 for every complete forward revolution of the piston 42. When the brake bands 34 are contracted to prevent rotation of the casing 22, this reverse movement will be applied to the driven shaft 28.

If it is desired to have the engine idle, that is, to have the machine or other device upon which the clutch is mounted to remain stationary, the brake band 34 will be released to allow the casing 22 to rotate forward and thereby carry with it the rollers 50 at a rate which will exactly equal the reverse rotation which would otherwise be applied to the cam block 63. When in this position, the oil will circulate freely from one end of the piston 42 to the other as it reciprocates and no operation will be imparted to the cam block 63 and its driven shaft 28. When it is desired to have low speed forward, the sleeve valve 58 will be partially closed so as to retard the passage of oil around the cylinder 56, thereby retarding the rate of reciprocation of the piston 42. This will result in additional forward rotation of the casing 22 at a rate in excess of the rate of rotation which would be applied to the cam block 63, which excess forward rotation is the measure of the forward movement of the driven shaft 28. As said sleeve valve 58 approaches closed position, said forward speed gradually increases until the flow of oil is entirely stopped, thereby completely checking the reciprocation of piston 42 and locking the parts together to obtain full speed forward.

It is to be noted that the cam block 63 is rotated relatively in a reverse direction to that of the piston 42 by reason of the fact that the rollers 66 pull or push (according to the direction of reciprocation of the piston 42) on the walls of the groove 64, this pull or push being the relative amount of reverse rotation of the cam block 63. Stated in other words, when one of these nodes of the piston 42 travels forward on the rollers 50, this movement being one-sixth of a complete revolution, a roller 66 must travel completely along one of the four nodes of the groove 64, but each of the four nodes of the groove 64 represents one-fourth of a complete revolution. Therefore, the rollers 66 must bear upon the walls of the groove 64 to cause a reverse rotation equal to the difference between one-fourth of a revolution and one-sixth of a revolution, which is one-twelfth. Therefore, for the complete forward rotation of the six nodes of the piston 42, six-twelfths or one-half of one complete revolution of the cam block 63 will have been produced.

Figure 6:
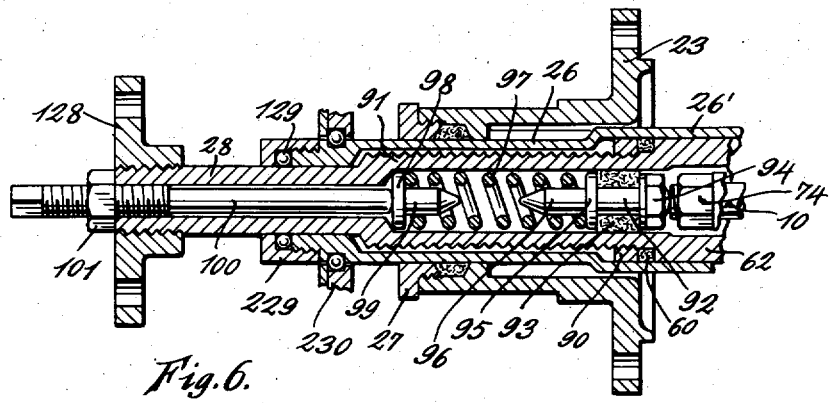
Fig. 6 is a longitudinal section showing a modified form of means for taking care of oil expansion.

In Fig. 6 a modified form of means is shown for taking care of expansion of the oil due to temperature changes or the like. This consists in providing the driven shaft 28 with an enlargement 91 onto which is threaded a packing ring 90 which retains the packing material 60 upon the extension 62 of the cam block 63. The shaft 28 is bored out and receives a stem 92 which carries packing material 93 retained on said stem between a nut 94 and a shoulder 95. Said stem 92 is provided with a centering pin 96 which enters a spring 97 disposed in the bore of said shaft 28, the opposite end of said spring being received by a pin 99 whose head 98 bears against an adjusting stem 100 which is threaded into the shaft 28 and secured in adjusted position by means of a lock nut 101. This form also shows a slightly modified form of ball retainer 229 and yoke mounting 230.

Figure 7:
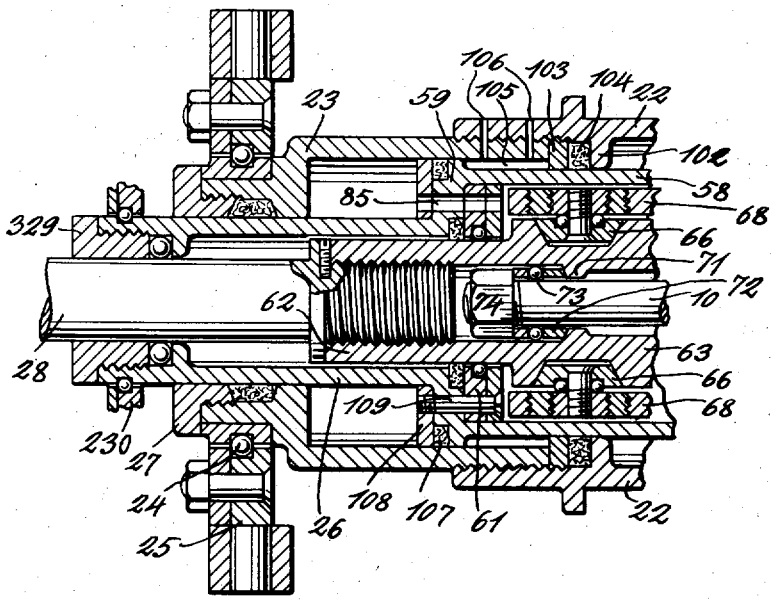
Fig. 7 is a longitudinal fragmentary section showing a modified form of valve sleeve construction.

In Fig. 7 a modified form of valve construction is disclosed. In this modification the casing 22 is provided with an internal annular rib 102 against which a packing material 104 is retained by means of a collar 103 threaded into said casing 22. The hub 59 of the valve sleeve 58 is offset slightly to provide, between the sleeve 58 and the head 23, an annular air cavity 105 having communication with the atmosphere by means of vents 106. In this form the head 23 is threaded into the casing 22. The hub 59 and associated parts are provided with one or more passages 85 for the movement of oil from the rear of the hub 59 to the front thereof when the valve is reciprocated as in the other form, and packing material 107 is retained on said hub by means of a collar 108, for the purpose of preventing leakage of oil into said cavity 105, said collar 108 being secured by means of screws 109 or the like which also retain the ball retainers 61. In this form the annular offset of the hub 59 is equal to the thickness of the valve stem 26 so that the volume of the displacement by said offset of the hub 59, which is represented by said chamber 105, is equal to the displacement of the valve stem or sleeve 26 when the valve is operated. This construction also maintains uniform volume within the device.

Fig. 7 also shows a further modified form of ball retainer 329 which consists simply of a retaining nut threaded into sleeve 26, for engagement with the balls.

Figure 8:
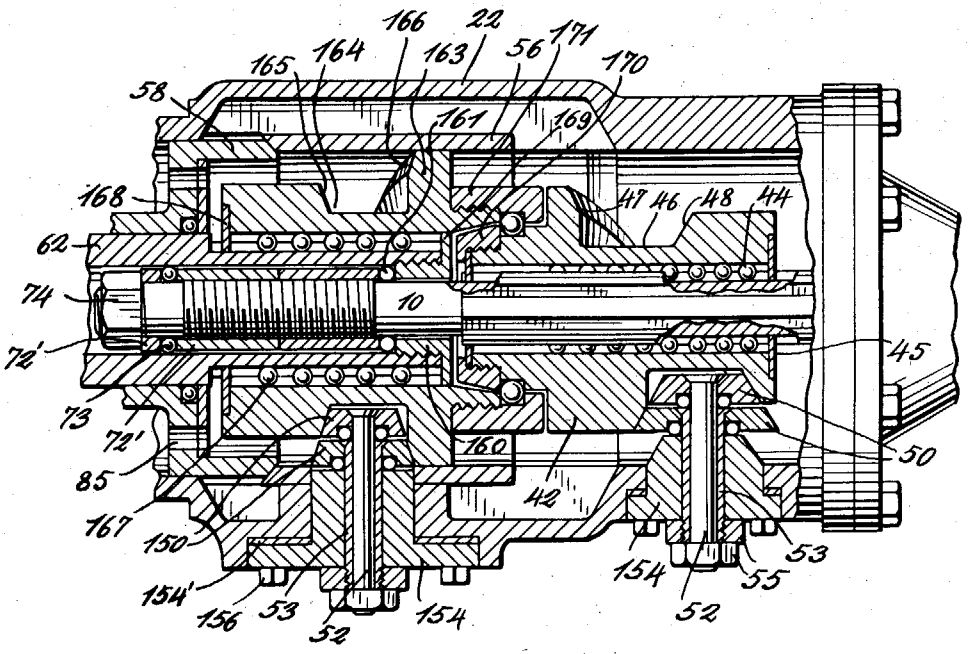
Fig. 8 is a longitudinal section showing a modified construction and arrangement of cam members on the drive and driven shafts.

In Fig. 8 a modified form of the reversing cam member is shown. In this case the extension 62 which is secured to the driven shaft 28 itself has the inner end of the drive shaft 10 journaled therein. This journaling is accomplished by means of a ball retainer 160 threaded into the inner end of the extension 62 to retain balls 161 on the shaft 10, a second ball retainer being threaded onto said shaft 10 to engage the opposite sides of the balls 161. The balls 73 at the extreme inner end of said shaft are retained by retaining devices 72′ one of which also is threaded on shaft 10 and the other retained by means of nut 74. In this form the reversing cam member 163 is separate from the extension 62 and reciprocates thereon. This cam member is provided with a cam groove 164 and preferably has a low cam wall 165 on a higher cam wall 166 adapted to be engaged by a pair of rollers 150 of different sizes, one of which is disposed farther inward to engage the lower cam wall 165, after the fashion of the rollers 50 and cam walls 47 and 48. These rollers are secured to the casing 22 by means of a sleeve 53 and a stem 52 in the same manner in which the rollers 50 are secured. In this particular figure the nuts 54 which are used in the form of Fig. 1, are substituted by blocks 154 which are secured in place by means of machine screws 156, the adjustment of the parts being determined by means of shims 154′ as indicated.

The reciprocating cam member 163 is splined on the extension 62 by means of balls 167 traveling in grooves in the extension 62 and in the member 163. A special flange 168 similar to flange 45 of Fig. 1 is employed to retain the balls in the grooves and to prevent the passage of oil through the grooves, and the consequent displacement of the balls thereby, this flange being secured to the cam member 163. In order to prevent displacement of the balls 167 at the extreme inner end of the extension 62 a similar retaining flange 169 is provided which is integral with the ball retainer 160. In this form the cam member 163 is in the form of a piston which reciprocates within the short cylinder 56, the valve 58 being provided as in the other form; the piston 42 which reciprocates on shaft 10 as in the form of Fig. 1, is connected with the piston 163 by means of a bearing which comprises a retainer 170 secured to an extension on the piston 42, a retainer 171 secured to an extension on the piston 163, and a series of balls retained by said retainers 170 and 171 and connecting the two pistons 42 and 163 so that they will move together longitudinally but can rotate upon one another in opposite directions.

In the operation of this form the manipulation of the valve 58 is the same as in the other form, with the exception that the piston 163 is the controlling piston. When the valve 58 is closed reciprocation of both pistons is prevented and the pistons are locked so as to rotate bodily forward with the casing 22. However, when the valve 58 is entirely or partially open the differential of movement of the two pistons will be similar to that of the members 42 and 63 of Fig. 1. In this modified construction the piston 42 still retains the cam groove 46 with its six nodes while the piston 163 has a cam groove with four nodes similar to the groove 64 of Fig. 1. The two sets of rollers 50 and 150 cause the two pistons 42 and 163 to reciprocate together, but the difference in the number of nodes in the two grooves will produce or tend to produce reverse rotation of piston 163 relative to piston 42 in exactly the same manner in which the cam block 63 of Fig. 1 rotates with reference to piston 42.

In both forms, the adjustable bearing 25 is used which is in the nature of a universal joint so as to compensate for possible errors in alinement of the bearings 21 and 24.

In order to compensate for wear of the band 34 and of the bevel faces 40 of the yoke 33, the band 34 is conveniently made in two parts connected by an adjusting bolt and nut 37′ opposite bolt 37, a spring 36′ being used to maintain the upper ends of said parts in separated relation.

In the operation of the resilient diaphragm 80, this will yield under excessive pressure at which time some leakage will occur at packing retainer 81. Centrifugal force during the rotation of the parts will throw this leakage outward to the apertures in the diaphragm, the accumulation of the oil adjacent said apertures being insured by the tapering wall of the head 20. As a result the bulk of the leakage oil will work its way past the valves 83 into the piston chamber, this return being assisted by the partial vacuum or suction produced by the piston as it moves away from said diaphragm. Oil which might eventually work its way beyond the hub 82 and past the bearings of the shaft 10 into clutch part 18 will be allowed to drain therefrom by way of a hole 18′ in the bottom thereof so as to avoid interference with the braking action between the parts 12 and 18. In the operation of the form of expansion device of Fig. 6, the piston 93 will be moved against the tension of the spring 97 to equalize the excess pressure, the tension of the spring being adjustable by means of a stem 100.

I want to call attention to the fact that owing to the considerable mass of the reciprocating cam member 42 (Fig. 1), it naturally has a corresponding inertia and therefore resists the forces that tend to reciprocate it on its shaft. This force is transmitted through the inclined walls of the cam groove 64 and the rollers 66 and therefore forms part of a resultant force of which the other component acts to produce a torque. It is therefore evident that even with the valve 58 in wide open position there will still be a torque exerted which tends to cause the cam members to rotate relative to each other.

I claim:

1. In a hydraulic transmission, a rotary casing, a pair of shafts extending into said casing, a cam member reciprocable upon one shaft, a cam member nonrotatably mounted on the other shaft, each cam member having a cam groove therein, one of said grooves having more nodes than the other, rollers carried by said reciprocating cam member and extending into said groove in the other cam member and other rollers adapted to be fixedly positioned and extending into the groove of the other cam member.

2. In a hydraulic transmission, a rotary casing, a pair of shafts extending into said casing, a cam member reciprocable upon one shaft, a cam member nonrotatably mounted on the other shaft, each cam member having a cam groove therein, one of said grooves having more nodes than the other, rollers carried by said reciprocating cam member and extending into said groove in the other cam member and other rollers adapted to be fixedly positioned and extending into the groove of the other cam member, a cylinder in which the first member reciprocates, and a valve to control the passage of oil from one end of said first member to the other.

3. In a hydraulic transmission, a rotary casing, a pair of shafts extending into said casing, a cam member reciprocable upon one shaft, a cam member nonrotatably mounted on the other shaft, each cam member having a cam groove therein, one of said grooves having more nodes than the other, rollers extending into said grooves to determine the relation of one cam member to the other and the rotation thereof, and braking means to engage and prevent rotation of the casing.

4. In a hydraulic transmission, a rotary casing, a pair of shafts extending into said casing, a cam member reciprocable upon one shaft, a cam member nonrotatably mounted on the other shaft, each cam member having a cam groove therein, one of said grooves having more nodes than the other, rollers extending into said grooves to determine the relation of one cam member to the other and the rotation thereof, a cylinder in which the first member reciprocates, a valve to control the passage of oil from one end of said first member to the other, and braking means to prevent rotation of the casing while said cam members rotate.

5. In a hydraulic transmission, a rotary casing, a pair of shafts extending into said casing, a cam member nonrotatably and reciprocably mounted on one shaft, a cam member nonrotatably mounted on the other shaft, each cam member having cam grooves therein, and rollers extending into said grooves to determine the relation of said cam members to one another, said grooves being so arranged that forward rotation of one member produces relative reverse rotation of the other.

6. In a hydraulic transmission, a rotary casing, a pair of shafts extending into said casing, a cam member nonrotatably and reciprocably mounted on one shaft, a cam member nonrotatably mounted on the other shaft, each cam member having cam grooves therein, rollers extending into said grooves to determine the relation of said cam members to one another, said grooves being so arranged that forward rotation of one member produces relative reverse rotation of the other, one of said shafts extending into a hollow extension on the other and journaled therein.

7. In a hydraulic transmission, a rotary casing, a pair of shafts extending into said casing, one of said shafts having an extension in which the other is journaled, cam members nonrotatably carried by said shafts, one of said cam members being reciprocable upon its shaft and means connecting said cam members.

8. In a hydraulic transmission, a rotary casing, a pair of shafts extending into said casing, one of said shafts having an extension in which the other is journaled, cam members nonrotatably carried by said shafts, one of said cam members being reciprocable upon its shaft, means to control the movement of oil from one end of said reciprocable member to the other, rollers connected with the casing and controlling the reciprocable cam member to determine its reciprocation, and rollers connected with the other cam member to control the relation of said cam members.

9. In a hydraulic transmission, a rotary casing, a pair of shafts extending into said casing, one of said shafts having an extension in which the other is journaled, cam members nonrotatably carried by said shafts, one of said cam members being reciprocable upon its shaft, means to control the movement of oil from one end of said reciprocable member to the other, rollers connected with the casing and controlling the reciprocable cam member to determine its reciprocation, and rollers connected with the other cam member to control the relation of said cam members, cam grooves being provided for engagement by said rollers, said grooves being so related that forward rotation of one cam member produces relatively reverse rotation of the other.

10. In a hydraulic transmission, a rotary casing, braking means to engage the same and prevent rotation thereof, a pair of shafts extending into said casing, cam members nonrotatably mounted upon said shafts, one of said members being reciprocable, means whereby forward rotation of one cam member produces relatively reverse rotation of the other, a clutch mounted on one shaft adapted to engage an engine clutch, and a fixed clutch member also adapted to be engaged thereby to prevent rotation of said shaft.

11. In a hydraulic transmission, a rotary casing, a pair of shafts extending thereinto, a cam piston reciprocable upon one shaft, a cam block fixed upon the other shaft, each cam member having a cam groove in the piston and rollers on the piston projecting into the groove in the cam block.

12. In a hydraulic transmission, a rotary casing, a pair of shafts extending thereinto, a cam piston reciprocable upon one shaft, a cam block fixed upon the other shaft, each cam member having a cam groove therein, rollers in the casing projecting into the groove in the piston and rollers on the piston projecting into the groove in the cam block, said grooves being so related that forward rotation of one cam member produces relatively reverse rotation of the other.

13. In a hydraulic transmission, a rotary casing, a pair of shafts extending thereinto, a cam piston reciprocable upon one shaft, a cam block fixed upon the other shaft, each cam member having a cam groove therein, rollers in the casing projecting into the groove in the piston and rollers on the piston projecting into the groove in the cam block, one of said grooves having a greater number of nodes than the other so that forward rotation of said one groove produces relatively reverse rotation of said other groove.

14. In a hydraulic transmission, a rotary casing, a pair of shafts projecting into said casing, a reciprocable cam member splined upon each of said shafts, said cam members being rotatably connected with one another in fixed relation longitudinally, each cam member having a cam groove, and rollers mounted on the casing and projecting into the groove on one of the cam members.

15. In a hydraulic transmission, a rotary casing, a pair of shafts projecting into said casing, a reciprocable cam member splined upon each of said shafts, said cam members being rotatably connected with one another in fixed relation longitudinally, each cam member having a cam groove, and rollers mounted on the casing and on one cam member and projecting into each of said grooves, said grooves being so related that forward rotation of one cam member produces relatively reverse rotation of the other.

16. In a hydraulic transmission, a rotary casing, a pair of shafts projecting into said casing, a reciprocable cam member splined upon each of shafts, said cam members being rotatably connected with one another in fixed relation longitudinally, each cam member having a cam groove, and rollers mounted on the casing and projecting into each of said grooves, one of said grooves having a greater number of nodes than the other so that forward rotation of said one groove produces relatively reverse rotation of said other groove.

17. In a hydraulic transmission, a casing containing oil, a piston reciprocable therein, and a radially disposed resilient diaphragm having apertures therein adjacent its periphery whereby leakage oil may return to the main chamber within the casing.

18. In a hydraulic transmission, a rotary casing, a pair of shafts extending into said casing, a cam member reciprocable upon one shaft, a cam member nonrotatably mounted on the other shaft and means to produce relative rotation between said cams as one reciprocates, said means comprising cooperating cam grooves and rollers, said cam grooves each having a different number of nodes.

19. In a hydraulic transmission, a rotary casing, a pair of shafts extending into said casing, a cam member reciprocably but nonrotatably mounted on one shaft, means for reciprocating said cam member on the shaft whenever relative rotation occurs between the cam and the casing, a second cam member rigidly connected to the other shaft, and means for rotating said last mentioned cam member with respect to the first mentioned cam member whenever the latter reciprocates on the shaft.

20. In a hydraulic transmission, a rotary casing, a pair of shafts extending into said casing, a cam member reciprocable on one shaft, cooperating cam grooves and rollers on said casing and said cam, said cam grooves having a plurality of nodes, whereby the cam will be caused to reciprocate as it rotates relative to the casing, a cam nonrotatably and nonslidably mounted on the other shaft, said cams having means to produce relative rotary movement when the first cam reciprocates, said means comprising a roller on one cam member and a cooperating cam groove on the other cam member, said groove having a different number of nodes from the first mentioned groove.

21. In a hydraulic transmission, a rotary casing, a pair of shafts extending into said casing, a cam member reciprocable on one shaft, cooperating cam grooves and rollers on said casing and said cam, said cam grooves having a plurality of nodes, whereby the cam will be caused to reciprocate as it rotates relative to the casing, a cam nonrotatably and nonslidably mounted on the other shaft, said cam having means to produce relative rotary movement when the first cam reciprocates, said means comprising a roller on one cam member and a cooperating cam groove on the other cam member, said groove having a different number of nodes from the first mentioned groove, and braking means to engage and prevent rotation of the casing.

22. In a transmission device, in combination, a pair of spaced bearings, a pair of aligned shafts, one of which is rotatably journaled in each bearing, a cam member reciprocable upon one shaft, another cam member nonrotatably connected with the other shaft, each cam member having a cam groove therein, one of said grooves having more nodes than the other, rollers carried by the reciprocating cam member and extending into the groove in the other cam member, a member mounted for rotation with respect to both of said shafts and rollers carried by said last mentioned member and extending into the groove of the other cam member.

23. In a transmission device, in combination, a pair of aligned relatively stationary bearings, a pair of aligned shafts, one of which is journaled in each of said bearings, means for holding the adjacent ends of the shafts in axial alignment, cam members nonrotatably carried by said shafts, means for connecting said cam members, one of said cam members being reciprocable upon its shaft and means for causing said last named cam member to reciprocate.

24. In a transmission device, in combination, a casing having two aligned bearings, a shaft journaled in each of said bearings and extending into the casing, means for holding the adjacent ends of said shafts in alignment, cam members nonrotatably carried by said shafts, means for connecting the cams, one of said cam members being reciprocable upon its shaft and means for reciprocating said last named cam.

25. In a transmission device, in combination, a casing, a pair of shafts extending thereinto, a cam member of considerable mass nonrotatably but reciprocably mounted on one shaft, a cam block fixed upon the other shaft, one of said cam members having a cam groove provided with a plurality of nodes and the other having a roller projecting into the groove whereby said cam members will have a relative reciprocable movement when they rotate relative to each other.

26. In a transmission device, in combination, a casing, a pair of shafts extending into said casing, a cam member reciprocable upon one shaft, a cam member nonrotatably mounted on the other shaft and means to produce relative rotation between said cams as one reciprocates with respect to the other, said means comprising a cam groove and rollers said groove having a plurality of nodes.

In testimony whereof I affix my signature.

JOHN A. MALM.